United States Patent [19]
Frick et al.

[11] 3,951,739
[45] Apr. 20, 1976

[54] POSITIONING AND LOCKING DEVICE FOR FUEL PIN TO GRID ATTACHMENT

[75] Inventors: Thomas M. Frick, Irwin; Arthur L. Wineman, Greensburg, both of Pa.

[73] Assignee: The United States of America as represented by the United States Energy Research and Development Administration, Washington, D.C.

[22] Filed: July 15, 1974

[21] Appl. No.: 488,638

[52] U.S. Cl. ............................ 176/78; 211/60 R
[51] Int. Cl.² ........................................ E21B 7/04
[58] Field of Search ............. 176/78, 76; 211/60 R, 211/60 S; 248/225; 312/321

[56] References Cited
UNITED STATES PATENTS

| | | | |
|---|---|---|---|
| 3,086,935 | 4/1963 | Groh et al. | 176/78 X |
| 3,200,045 | 8/1965 | Vendryes et al. | 176/61 X |
| 3,228,854 | 1/1966 | Bekkering et al. | 211/60 R |
| 3,743,578 | 7/1973 | Arganier et al. | 176/81 X |
| 3,764,471 | 10/1973 | Ripley | 176/76 X |
| 3,852,154 | 12/1974 | Carlson et al. | 176/78 |
| 3,857,755 | 12/1974 | Kinzer et al. | 176/76 X |

*Primary Examiner*—Samuel Feinberg
*Assistant Examiner*—Peter A. Nelson
*Attorney, Agent, or Firm*—Dean E. Carlson; Kenneth L. Cage

[57] ABSTRACT

A positioning and locking device for fuel pin to grid attachment provides an inexpensive means of positively positioning and locking the individual fuel pins which make up the driver fuel assemblies used in nuclear reactors. The device can be adapted for use with a currently used attachment grid assembly design and insures that the pins remain in their proper position throughout the in-reactor life of the assembly. This device also simplifies fuel bundle assembly in that a complete row of fuel pins can be added to the bundle during each step of assembly.

8 Claims, 8 Drawing Figures

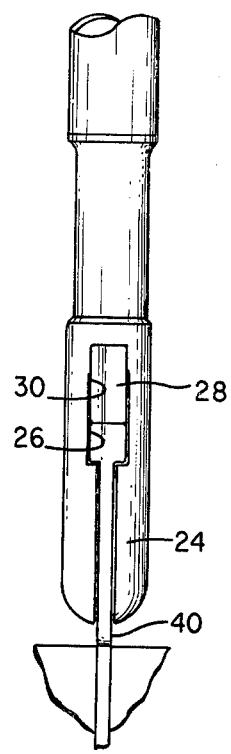 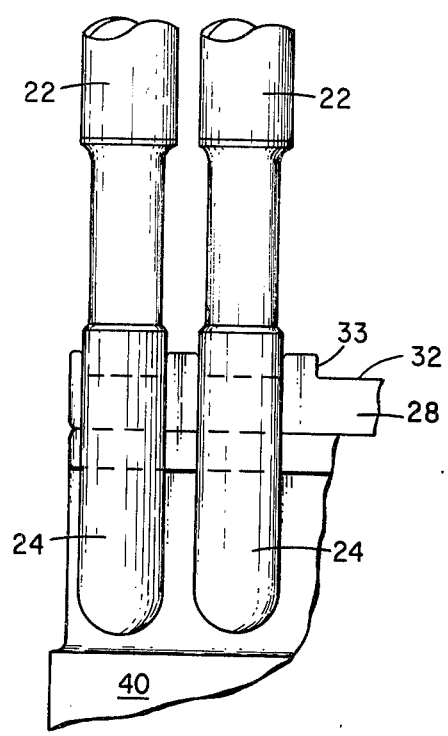
Fig. 2a　Fig. 2b
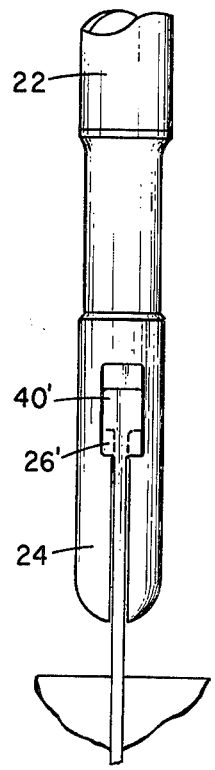 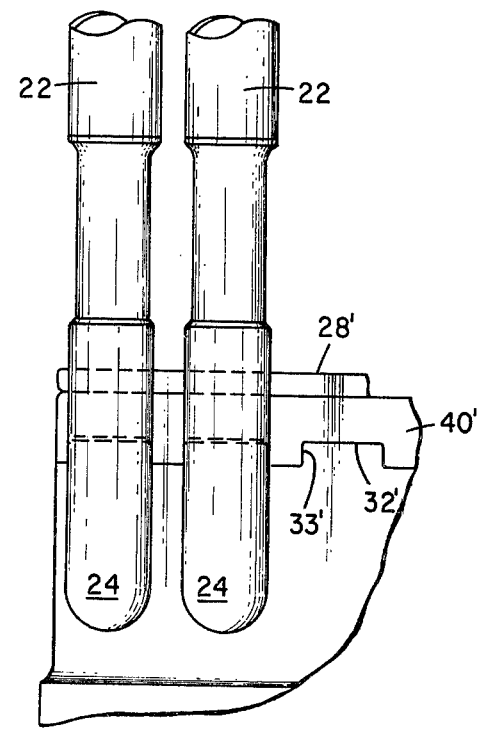
Fig. 4a　Fig. 4b

POSITIONING AND LOCKING DEVICE FOR FUEL PIN TO GRID ATTACHMENT

BACKGROUND OF THE INVENTION

The invention described herein was made in the course of, or under, Contract AT(45-1)-2171 with the United States Atomic Energy Commission.

Field of the Invention

The invention relates to a nuclear reactor and more particularly to a positioning and locking device for a fuel pin to grid attachment for fuel assemblies of a nuclear reactor.

Description of the Prior Art

U.S. Pat. No. 2,708,656 isssued to E. Fermi et al on May 17, 1955 explains in detail particular nomenclature associated with nuclear reactors. Fuel assemblies in high power nuclear reactors, such as fast breeder reactors, comprise one or more bundles of canned fuel pins disposed in a jacket through which the fluid coolant flows. Coolant flowing through a reactor core at high velocities is a source of energy that can induce and sustain many undesirable conditions in reactor core components. For example, undesirable conditions which may exist in a driver fuel assembly using wire wrapped fuel pins include: vibration, with its resulting fretting, wear and fatigue, and/or poor flow distribution which may lead to hot spots, fuel meltdown, or other conditions which could seriously impair the safe operation of the nuclear reactor.

One method of controlling or eliminating the above mentioned conditions is to rigidly attach the fuel pins to the driver fuel assembly duct. There are many prior art schemes which could be used for this rigid attachment but due to the complexity and smallness of the parts, cost, and space limitations arising from hydraulic considerations, many of these must be discarded.

Other prior art schemes include U.S. Pat. No. 3,743,578 issued to Agranier et al on July 3, 1973 describing a fuel pin retaining device comprising two parallel spindles attached to the shroud and disposed transversely of the direction of circulation of the coolant and parallel rails disposed perpendicularly to the spindles and sliding thereon and in the plugs of a layer of pins. U.S. Pat. No. 3,200,045 issued to Vendryes et al on August 10, 1965 describes, at FIG. 3, a fuel assembly having fuel needles secured only at the bottom portion which slides on parallel rails forming a grid structure having a hexagonal outline.

These schemes, however, have the disadvantages of limiting pin travel in only the axial direction, and not in the transverse direction of coolant flow.

SUMMARY OF THE INVENTION

It is therefore a primary object of this invention to provide an inexpensive means of positioning and locking fuel pins used in nuclear reactor assemblies.

It is a further object of this invention to provide a means which will restrain fuel pin travel in every direction.

It is a further object of this invention to eliminate or minimize the number of structural welds needed to provide positive positioning and locking of fuel pins used in nuclear reactor assemblies.

It is a further object of this invention to provide a means of positioning and locking fuel pins that limits damage to components from vibration induced wear, fretting, hot spots and fatigue.

It is a further object of this invention to provide a means of positioning and locking fuel pins which does not hinder the coolant flow distribution pattern therein.

It is a further object of this invention to provide a means of positioning and locking the fuel pins in reactor fuel assemblies which limits the pressure drop across the fuel pin attachment grid.

A still further object of this invention is to provide a means of positioning and locking the fuel pins disposed to provide ease of assembly whereby one complete row of fuel pins is installed in one operation.

The present inventive positioning and locking device for nuclear fuel pins accomplishes the above objects and comprises an elongated fuel pin assembly having a fuel pin lower end cap, said end cap having a keyed slot perpendicular to its major axis; a positioning and locking bar adapted to slidably mate with a first part of said keyed slot, said bar having multiple, spaced apart, notches exposed along its length; a thin wall fuel pin attachment and flow distribution block disposed below said fuel pin assembly, said block having an upper edge adapted to support said positioning and locking bar at each extremity thereof and having spaced apart elongated keyed slots in the walls thereof, each of said slots having its major axis parallel to the major axis of said assembly; a fuel pin attachment grid beam adapted to slidably mate with each keyed slot of said fuel assembly whereby multiple fuel pin assemblies originally maintained in locked spaced apart rows. More specifically, the fuel pin attachment and flow distribution blocks may be of general hexagonal cross section and the fuel pin attachment grid beam may be of I-beam cross section.

BRIEF DESCRIPTION OF THE DRAWINGS

FIGS. 2a and 2b are enlarged views parallel to the major axis in perpendicular thereto respectively of the pin attachment to the locking bar and grid beam shown in FIG. 1.

FIGS. 4a and 4b are enlarged views parallel and perpendicular to the major axis of the locking bar and grid beam of an alternate embodiment of the present invention.

DESCRIPTION OF THE PREFERRED EMBODIMENT

U.S. Pat. No. 3,518,163 issued to D. R. DeBoisblanc on June 30, 1970 describes in detail the interrelationship of fuel assembly ducts or tubes to the remainder of the reactor structural component in a sodium-cooled fast-flux test reactor.

Figure 1:
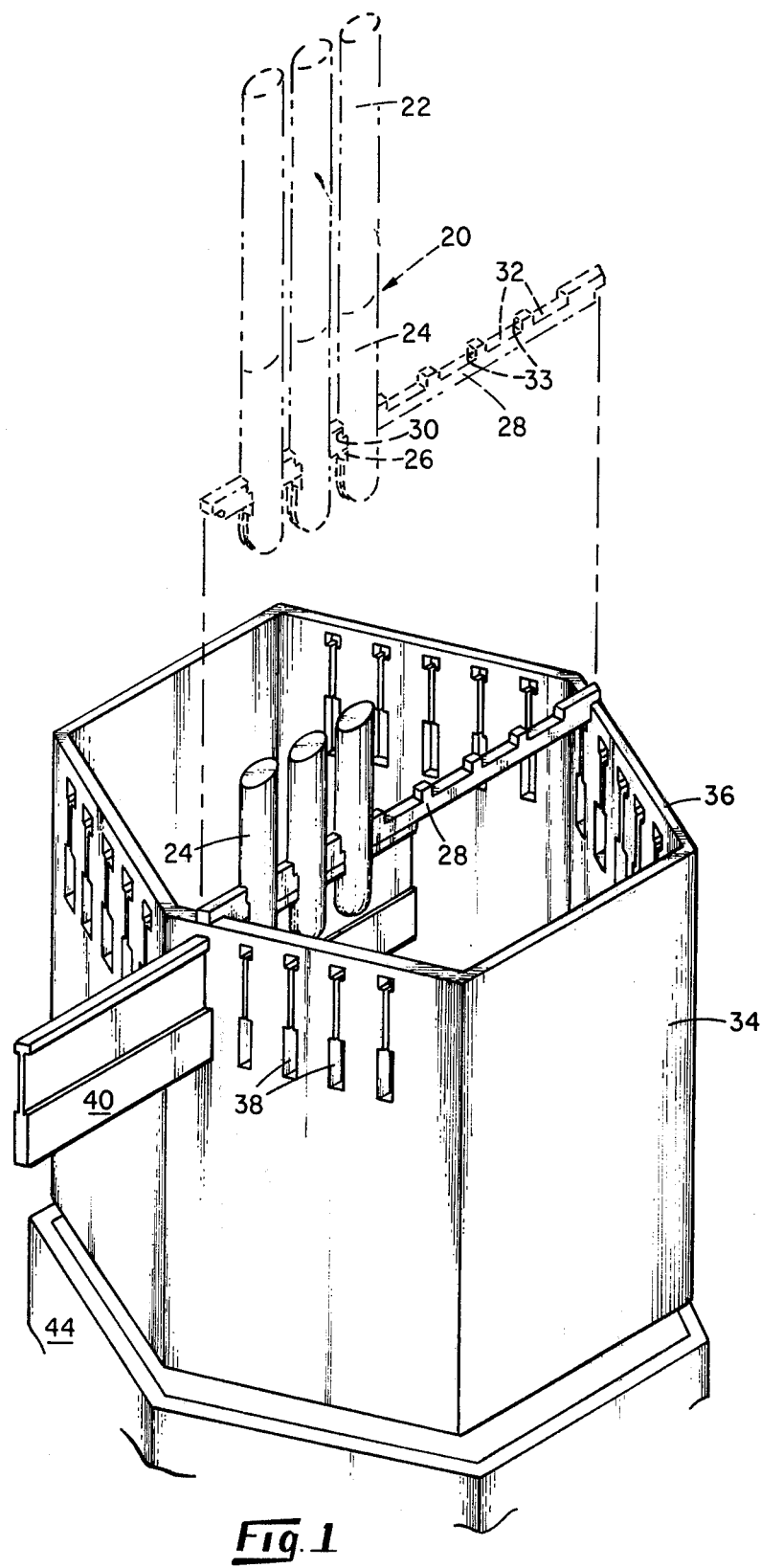
FIG. 1 is an orthographic view of a fuel assembly incorporating the features of the present invention.

Referring now to FIG. 1, the present inventive positioning and locking device for nuclear reactor fuel pins comprises an elongated fuel pin assembly 20 having a fuel pin 22 and lower end cap 24 affixed thereto. The end cap 24 defines a keyed slot 26 perpendicular to the major axis of the fuel pin 22. A positioning and locking bar 28 is adapted to slidably mate with a first part 30 of the keyed slot 26. The bar 28 has multiple, spaced apart, notches 32 disposed along the length of its major axis. Each notch defines at least two gripping edges 33 disposed perpendicular to the major axis of said locking bar 28. The width of the notches 32 is at least the diameter of the end caps 24 of the fuel pin 22 as illustrated in FIG. 2a and FIG. 2b.

A thin walled fuel pin attachment and flow distribution block 34 is disposed below the fuel assembly 20. This block has an upper edge 36 adapted to position the locking bar 28 at each extremity thereof. Multiple spaced apart elongated keyed slots 38 having their major axis parallel to the major axis of the fuel assemblies are formed in the walls of block 34.

A fuel pin attachment grid beam 40 is adapted to slidably mate with the keyed slots 26 of the fuel assembly 20 as well as the keyed slots 38 of block 34 whereby the plurality of fuel assemblies are rigidly maintained in the block 34 in spaced apart rows. The beam 40 rigidly maintains the fuel assemblies in position by assuring that the gripping edges 33 bear against the outer surface of the end caps 24 of fuel assembly 20.

Figure 3:
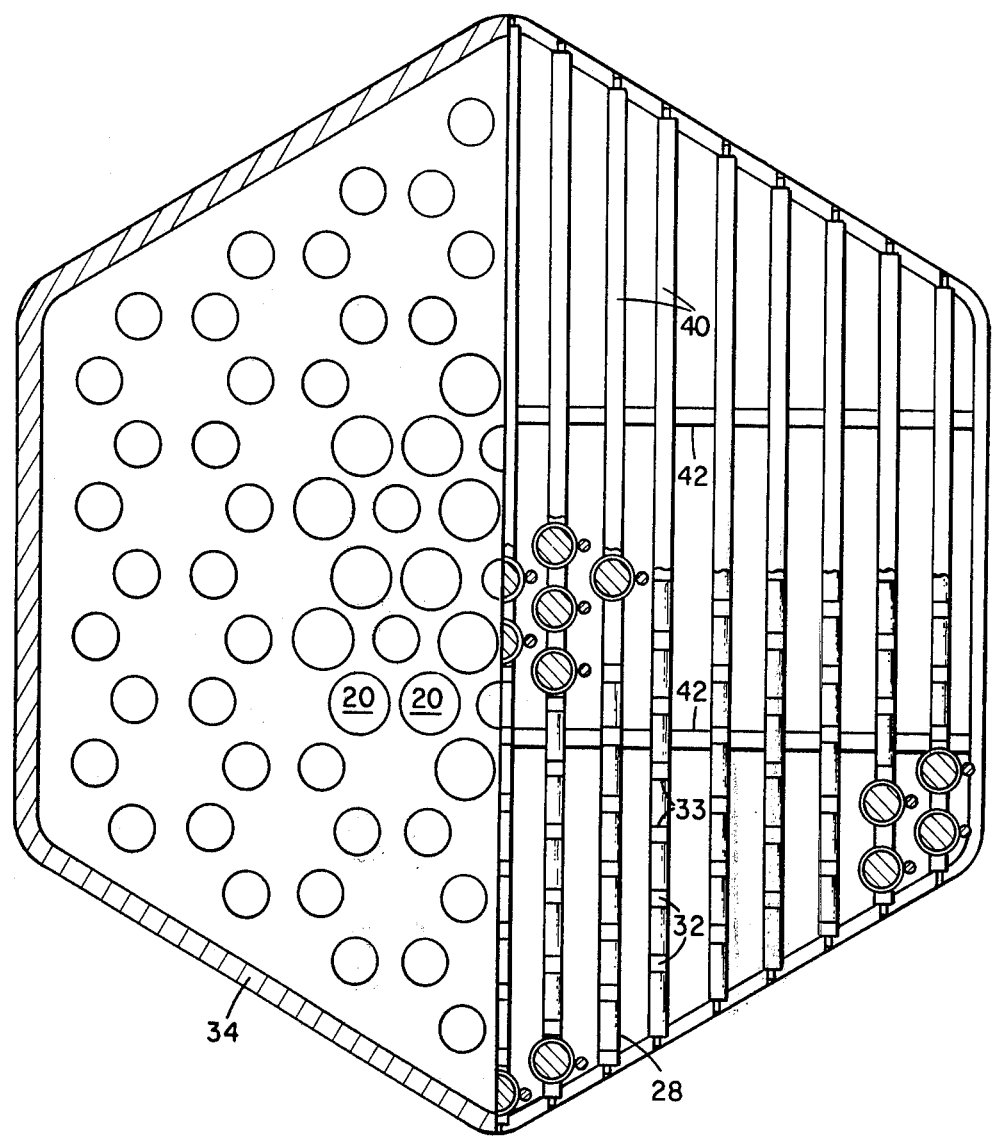
FIG. 3 is a plan view and cross section illustrating the fuel pin position in a hexagonal grid matrix.

Typically, the fuel pin attachment and flow distribution block 34 is of a general hexagonal cross section, as illustrated in FIGS. 1 and 3, and the fuel pin attachment grid beam 40 is of generally I-beam cross section. The keyed slot 26 and end cap 24 is of a rectangular shape and the keyed slot 38 in block 34 has the same configuration of the general I-beam cross section.

In a fast test reactor, as in the above cited D. R. DeBoisblanc patent, a large number of fuel assemblies may be positioned and locked as illustrated in FIG. 3. The block 34 has a plurality of parallel beams 40, spaced by a pair of transverse braces 42. These braces 42 prevent relative motion or deflection along the center portion of beams 40.

The attachment of the fuel pin 22 to a fuel assembly duct 44 as shown in FIG. 1 is accomplished in the following manner. All of the fuel pin assemblies 20 are placed in one row in a jig to line up the keyed slots 26 of end caps 24 to receive the positioning and locking bar 28. The bar 28 is installed by sliding it through the keyed slot of the fuel assembly 20. This assembly of the bar 28 and the fuel pin assemblies 20 are then placed in position on the fuel attachment and flow distribution block 34 which arranges the bar 28 into its proper position to allow for the insertion of the fuel pin attachment grid beam 40. The beam 40 is placed in position and slid through the keyed slot 38 of block 34 and the slot 26 of end cap 24 to lock the fuel pin assemblies 20 in position. Any welds considered necessary are then made on the assembly of the block 34 and beam 40 and this assembly is slipped into and attached by a mechanical means to the fuel assembly duct 44. It is noted that the configuration shown in FIG. 1 is completely self-locking and requires no structural welds.

An alternate embodiment includes a modification of the positioning and locking bar 28' and fuel pin attachment grid beam 40'. As shown in FIGS. 4a and 4b the fuel assembly end caps 24 again have a rectangular keyed slot 26' which receives the beam 40' having notches 32' defining gripping edges 33' disposed along its length. The locking bar 28 slidably mates with the beam 40' to force the gripping edges 33' into engagement with the outer surface of the fuel pin end caps 24 to rigidly maintain the fuel pin assemblies 20 in spaced apart rows.

Figure 5A:
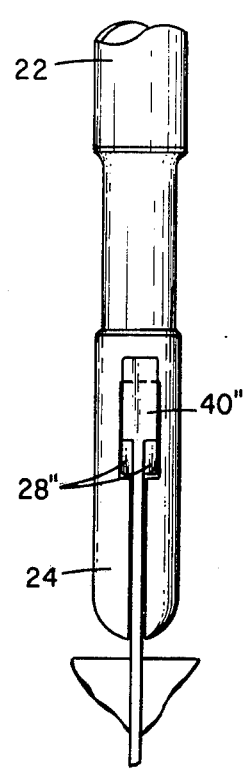
FIGS. 5a and 5b are enlarged views parallel and perpendicular to the major axis of the locking bar and grid beam of a second alternative embodiment of the present invention.
Figure 5B:
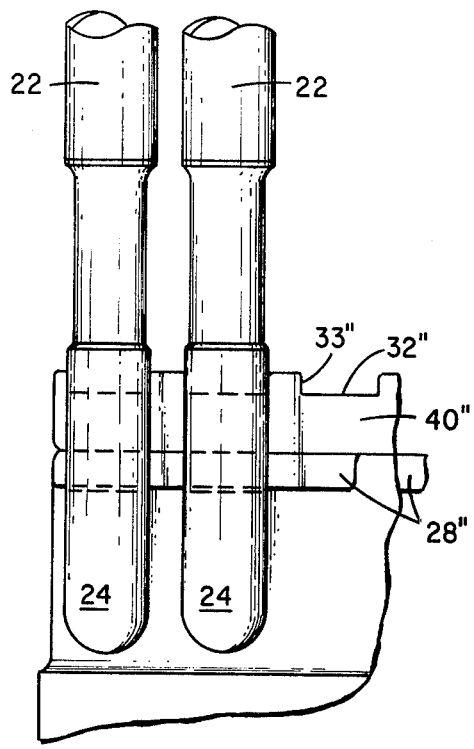

A second alternate embodiment modifies the fuel pin and attachment grid beam 40'' by placing the spaced apart notches 32'' defining gripping edges 33'' along the upper surface of the beam 40''. As shown in FIGS. 5a and 5b the locking bar 28'' comprises spaced apart parallel bars having an upper edge adopted to the beam 40'' and rigidly maintains the fuel pin assemblies 20 in locked spaced apart rows.

Thus, it is apparent that there has been provided in accordance with the present invention, a positioning and locking device for nuclear reactor fuel pins that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A positioning and locking device for nuclear reactor fuel pins comprising an elongated fuel pin assembly having a fuel pin lower end cap, said end cap having a keyed slot therethrough perpendicular to its major axis; a positioning and locking means adapted to slidably mate with a first part of said keyed slot, said means having multiple, spaced-apart, notches disposed along its length; a thin walled fuel pin attachment and flow distribution block disposed below said fuel pin assembly, said block having an upper edge to support said positioning and locking means at each extremity thereof and having multiple spaced apart elongated keyed slots in the walls thereof, each of said slots having its major axis parallel to the major axis of said fuel pin assemblies; a fuel pin attachment grid beam adapted to slidably mate with said keyed slot of said fuel pin assembly whereby a multiple fuel pin assembly is rigidly maintained and locked in spaced apart rows.

2. The device of claim 1 wherein said fuel pin attachment and flow distribution block is of general hexagonal cross section.

3. The device of claim 1 wherein said fuel pin attachment grid means is of general I-beam cross section.

4. The device of claim 1 wherein said positioning and locking means is a bar.

5. A positioning and locking device for a nuclear reactor fuel pin comprising an elongated fuel pin assembly having a fuel pin and lower end cap, said end cap having a keyed slot therethrough perpendicular to its major axis; a positioning and locking means adapted to slidably mate with a first part of said keyed slot; a fuel pin attachment grid beam adapted to slidably mate with said keyed slot of said fuel pin assembly, said means having multiple spaced apart notches along its length; a thin walled fuel pin attachment and flow distribution block disposed below said fuel pin assembly, said block having an upper edge adapted to support said fuel pin attachment grid beam at each extremity thereof and having multiple spaced apart elongated keyed slots in the walls thereof, each of said slots having its major axis parallel to the major axis of said fuel pin assemblies whereby multiple fuel pin assemblies are rigidly maintained in locked spaced apart rows.

6. The device of claim 5 wherein said fuel pin attachment beam is of general I-beam cross section having spaced apart notches disposed along the length of its lower surface and said positioning and locking beam is adapted to slidably mate with the upper surface of said fuel pin and attachment grid beam.

7. The device of claim 5 wherein said fuel pin attachment grid means is of general I-beam cross section having said spaced apart notches disposed along the length of its upper surface and said positioning and locking means comprises spaced apart bars adapted to slidably mate with the lower surface of said fuel pin attachment grid beam.

8. The device of claim 5 wherein said fuel pin attachment and flow distribution block is of general hexagonal cross section.

* * * * *